Nov. 27, 1928.
W. J. RHYNER
1,693,120
ADJUSTABLE SEAT FOR AUTOMOBILES
Filed Aug. 5, 1926
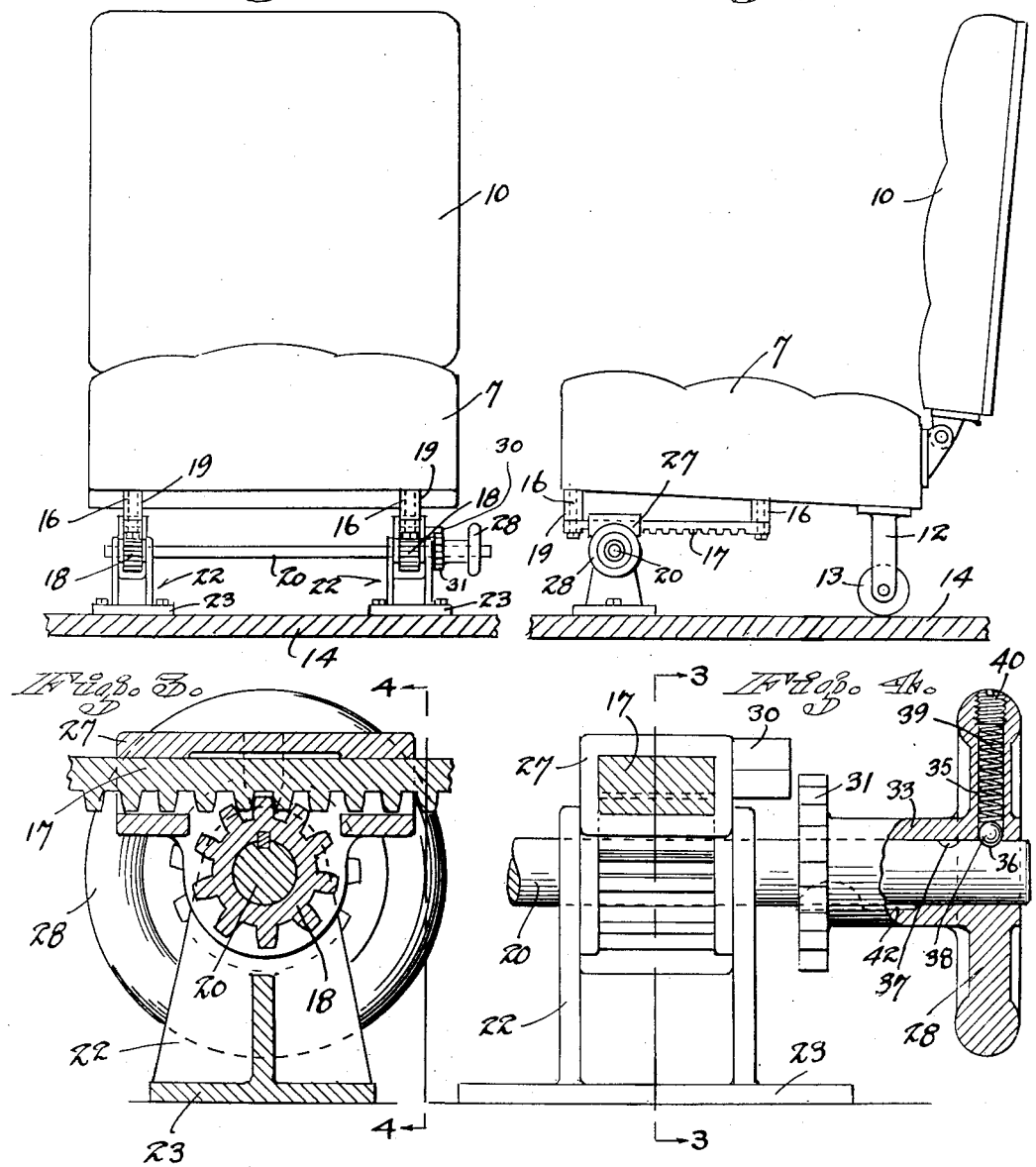
INVENTOR
WILLIAM J. RHYNER
BY
ATTORNEYS Patented Nov. 27, 1928.

1,693,120

UNITED STATES PATENT OFFICE.

WILLIAM J. RHYNER, OF SPRECKELS, CALIFORNIA.

ADJUSTABLE SEAT FOR AUTOMOBILES.

Application filed August 5, 1926. Serial No. 127,366.

This invention relates to adjustable seats for automobiles and has for one of its objects the provision of a seat which may be adjusted forwardly and backwardly. Another object of my invention is the provision of locking means for holding the seat in the adjusted position.

It is to be understood that although the seat of my invention is referred to as an automobile seat, it may be employed in other places than in automobiles.

For the comfortable seating of various drivers, when they drive one and the same automobile, it is very desirable to have a seat adjustable toward or away from the operating instruments, such as the steering wheel and those operated by the feet and arms; this situation is of course, due to the fact that different drivers vary in bodily dimensions, such as the sitting height and length of limbs.

With the foregoing objects in view, together with such other objects and advantages as may subsequently appear, this invention resides in the construction and arrangement of parts hereinafter described and claimed, and illustrated in the accompanying drawings, in which—

Fig. 1 is a front view of my adjustable seat.

Fig. 2 is a side view of the seat shown in Fig. 1.

Fig. 3 is a view taken on line 3—3 of Fig. 4; and Fig. 4 is a view taken on line 4—4 of Figure 3.

Referring to the drawings for a more detailed description thereof, the seat is indicated by the numeral 7, which is inclined as shown in Fig. 2, the rear end of the seat being lower than the forward end thereof. The seat is provided with a back 10. The rear part of the seat is supported by means of a pair of spaced legs 12, in the lower end of which are mounted rollers 13 resting on the floor 14 of the car.

To the under side of the seat 7 is secured a pair of spaced racks 17 parallel with the floor 14, the racks being spaced below the under side of the seat by means of any suitable fastening means, such for example, as the bolts 16, encircled by sleeves 19.

It will be seen that the racks 17 are parallel with each other and are disposed from the front toward the back or the rear of the seat. The racks 17 each engage a pinion 18. The pinions 18 are keyed to a shaft 20, rotatably supported adjacent each end by a pair of standards 22 which are secured to plate 23, the latter being bolted to the floor 14 of the car shown in Figs. 1 and 2.

The racks 17 are kept in engagement with the pinions 18 by means of cages 27 through which the racks pass. The cages 27 are apertured transversely to receive the shaft 20 on which the cages are loosely mounted. At one end of the shaft 20 is provided a hand-wheel 28, which is adapted to turn the shaft 20, which upon turning rotates the pinions 18, whereby the racks 17 and the seat 8 can be moved backward or forward according to which direction the hand-wheel is turned.

Extending outwardly from one of the cages 27 is a stud 30 adapted to be engaged by a tooth-wheel 31 which encircles the shaft 20 and which is secured to the hand-wheel by means of a connecting sleeve 33. The tooth-wheel 31, when engaged with the stud 30 locks the seat against movement, backward or forward.

In Fig. 4, the tooth-wheel 31 is out of engagement with the stud 30 in which position the seat may be adjusted by turning the hand-wheel. The hand-wheel 28 is provided with a radial recess 35 extending from the periphery to a transversed central aperture which is provided to receive the shaft 20.

The shaft 20 is provided with a pair of depressions 36 and 37, respectively. Fig. 4 shows a ball 38, resting in the depression 36 and held in that depression by a coiled spring 39 disposed in the recess 35. The upper end of the coiled spring abuts against a screw 40, which threadedly engages the rim of the hand-wheel and is disposed in the upper end of the aperture 35. The spring 39 is, of course, yieldable so that the ball 38 may be thrown into the inner depression 37, when force is exerted on the wheel to push it inwardly until the tooth-wheel 31 engages the dog 30.

It will be seen from Fig. 1 that the numeral 42 indicates a splined connection between the shaft and the connecting sleeve 33, whereby provision is made for a movement of the hand-wheel longitudinally of the shaft and whereby rotation of the wheel rotates the shaft.

While I have described one embodiment of my invention, modifications thereof may be readily devised without departing from the spirit of my invention, and it is to be understood that such modifications come within the scope of the appended claim.

I claim:

A device of the type described comprising a seat portion, racks secured to said seat, a supporting shaft, means for supporting said shaft, said racks being swingable about said shaft, pinions carried by said shaft and meshing with said racks, brackets connecting said racks with said pinions and permitting a swinging of said racks about said shaft as a center, means for supporting the rear portion of the seat and a back hingedly connected to the rear portion of the seat.

WILLIAM J. RHYNER.